United States Patent [19]

Giddens et al.

[11] Patent Number: 5,143,438
[45] Date of Patent: Sep. 1, 1992

[54] LIGHT SOURCES

[75] Inventors: Len Giddens, Slough; John C. White, Cuddesdon Oxford; John G. Holden, Hemel Hempstead, all of England

[73] Assignee: Thorn EMI plc, London, England

[21] Appl. No.: 774,314

[22] Filed: Oct. 10, 1991

[30] Foreign Application Priority Data

Oct. 15, 1990 [GB] United Kingdom ............... 9022343

[51] Int. Cl.⁵ .............................................. F21V 9/16
[52] U.S. Cl. ..................................... 362/84; 362/311; 362/351; 313/486
[58] Field of Search ............... 362/84, 311, 34, 253, 362/351; 313/486, 112, 487

[56] References Cited

U.S. PATENT DOCUMENTS

| | | | |
|---|---|---|---|
| 3,956,663 | 5/1976 | Verstegen et al. | 313/486 |
| 4,249,108 | 2/1981 | Wolfe | 313/486 |
| 4,469,980 | 9/1984 | Johnson | 313/25 |
| 4,827,187 | 5/1989 | Verlijsdonk | 313/486 |
| 4,931,910 | 6/1990 | Wills | 362/84 |
| 4,976,514 | 12/1990 | Murata et al. | 362/84 |
| 5,021,931 | 6/1991 | Matsui et al. | 362/84 |

Primary Examiner—Ira S. Lazarus
Assistant Examiner—Sue Hagarman
Attorney, Agent, or Firm—Fleit, Jacobson, Cohn, Price, Holman & Stern

[57] ABSTRACT

A luminaire is disclosed comprising a fluorescent plastics outer sleeve having a configuration such that a high proportion of the fluorescent light generated within the sleeve is emitted as visible light. The sleeve includes a fluorescent dye, which dye is excited by a blue phosphor discharge.

11 Claims, 2 Drawing Sheets

LIGHT SOURCES

The present invention relates to luminaires, and in particular, to fluorescent luminaires.

A luminaire is a component which filters or transforms light generated by a light source in order to provide light having some other form of spectral characteristic. In the particular case of a fluorescent luminaire, the source is fluorescent light and generally white light is provided therefrom.

Fluorescent lamps are available in a wide range of shapes and sizes and, in addition, are available with low or high quality colour rendering. High quality colour rendering lamps are used in a wide variety of applications and are especially useful when the colour temperature of the emitted light must be maintained within predefined limits.

To achieve high quality colour rendering, fluorescent lamps invariably incorporate phoshors which contain rare-earths. These phosphors cost many multiples of the cost of standard 'halophosphate' phosphors used in ordinary, i.e. lower quality colour rendering, lamps. Thus the cost of high quality colour rendering lamps is much greater than that of ordinary lamps, the higher cost being almost entirely attributable to the high cost of the rare-earth containing phosphors.

It has previously been proposed to provide a fluorescent lamp in which the phosphor material is embedded or dissolved within an outer plastic shell, as described in U.S. Pat. No. 4469980. In the lamp described in U.S. Pat. No. 4469980 a central discharge tube is provided to generate an ultra-violet discharge. The ultra-violet radiation so produced is absorbed by the phosphors and re-radiated as visible light. As the phosphors in the lamp of U.S. Pat. No. 4469980 are excited by ultra-violet radiation, the plastics material in which they are supported is, of necessity, exposed to fairly high levels of ultra-violet radiation, which are known to degrade both plastics material and organic fluorescent dyes, if these are used to generate the visible light. A significant aspect of the lamp described in U.S. Pat. No. 4469980 is the production of ultra-violet radiation of a specified wavelength in order to reduce the photodecomposition of the plastics shell attributable to the ultra-violet discharge. A pellet of vapourisable material is provided within the discharge tube which, preferably, is copper halide as this medium exhibits a strong and efficient output of near ultra-violet wavelengths of 327.4 and 324.7 nanometers.

However, such halide materials must operate at high temperatures, typically 600° C., because of the vapour pressures required to create a discharge. Furthermore, photodecomposition of the plastics shell and the dyes continues to occur as it is considered that for acceptable commercial applications, such as fluorescent lamps, the wavelength of the emitted radiation should be greater than about 420 nanometers. Additionally, the high operating temperature required to create the discharge precludes the use of the plastics shell as a sleeve around a conventional fluorescent tube as the plastics tube would then degrade or melt. Moreover, when photodecomposition of the plastics shell does occur, the shell cannot be easily replaced as it forms an integral part of the lamp structure.

The present invention seeks to provide an improved form of fluorescent luminaire having high quality colour rendering and a high efficiency of light output.

Accordingly, there is provided a luminaire comprising a glass housing member containing excitation means for exciting a phosphor material for providing radiation having a wavelength greater than about 420 nanometers, and a further member, at least partially surrounding the glass housing member, comprising a plastics material containing at least one fluorescent dye for providing visible light when excited by the radiation provided by the phosphor material.

Preferably, the radiation provided by the phosphor material comprises blue light and the plastics material contains three fluorescent dyes for providing, respectively, red, yellow, and green light.

Advantageously, the glass housing member comprises a tube and the further member comprises a plastics sleeve supported by the tube.

The further member comprises an outer surface having a plurality of concave depressions and an inner surface having a plurality of convex protrusions in substantial alignment with the concave depressions on the outer surface.

The further member has a substantially uniform thickness and the concave depressions have a radius of curvature at least ten times the thickness of the further member.

The present invention will now be described, by way of example only, with reference to the accompanying drawings in which.

Figure 1:
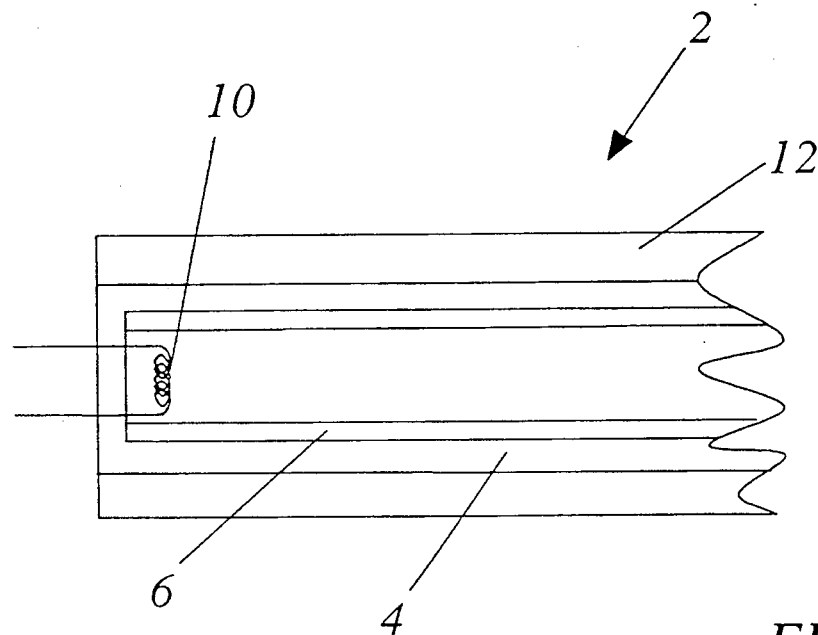
FIG. 1 shows a schematic representation of a luminaire in accordance with the present invention.

Referring to FIG. 1, a luminaire, such as a tubular fluorescent lamp 2, comprises a glass housing 4 coated on its inner surface with a phosphor material 6. The glass housing 4 defines a cavity 8 which contains a gas such as mercury vapour (not shown) which can support a discharge when excited by an electrode 10 coupled to a suitable voltage source. The discharge, in the embodiment shown, causes the emission of ultra-violet radiation. The phosphor material 6 absorbs the ultra-violet radiation and is arranged to emit radiation having a wavelength greater than 420 nanometers, for reasons which will be evident from the description below.

Arranged to at least partially surround the housing 4 is a sleeve or further housing member 12 which comprises a plastics material containing at least one fluorescent dye. In the embodiment shown the phosphor material 6 is arranged to emit blue light and the sleeve 12 contains three organic fluorescent dyes for emitting, respectively, red, yellow and green light. The sleeve shown consists of a single layer structure but it should be realised that a laminate structure may be employed, each layer of the laminate having an organic dye for emitting a respective colour of light. The colour composition of the fluorescent dyes incorporated in the plastics sleeve 12 has been shown to be superior to that of rare-earth containing phosphors. Thus, the substitution of such rare-earth phosphors by the fluorescent plastics sleeve 12 enables a significant reduction in the cost of high colour quality rendering fluorescent lamps to be achieved.

By using a blue light emitting phosphor to 'pump' the fluorescent dyes of the plastics sleeve 12, the sleeve is not exposed to ultra-violet radiation from within the lamp 2 and hence, photodecomposition of both the plastics material and the fluorescent dyes incorporated therein is minimised. Furthermore, flurorescent plastics, particularly those emitting light at the long wavelength end of the visible spectrum, are not efficiently excited by ultra-violet light emitted by mercury vapour discharges, such as is generated with the housing 4. The use of blue light to 'pump' the fluorescent plastics material increases, therefore, the efficiency of the luminaire. Additionally, the fluorescent plastics sleeve 12 is not exposed to the vacuum within the housing 4 and hence, the fluorescent plastic does not release chemical species over a long period of time which can cause contamination of the interior of the luminaire, which can give rise to a dramatic decrease in luminaire efficiency and ultimately cause the luminaire to become inoperative.

With fluorescent plastics, up to 80% of the light produced by the fluorescent plastic will normally be trapped within it by total internal reflection unless steps are taken to release it. Light trapping may be prevented by grinding the fluorescent plastic into a fine (e.g. few mm) powder—a form similar to that of the powder phosphors normally incorporated in fluorescent lamps, although grinding the fluorescent plastic will be very difficult due to the ductile nature of the material and is likely to be a prohibitively expensive process. Alternatively, scattering centres could be incorporated into the fluorescent plastic. While this approach would work, its efficiency would not be good since 50% of the light would be scattered back into the lamp where a significant proportion would be absorbed.

Figure 2:
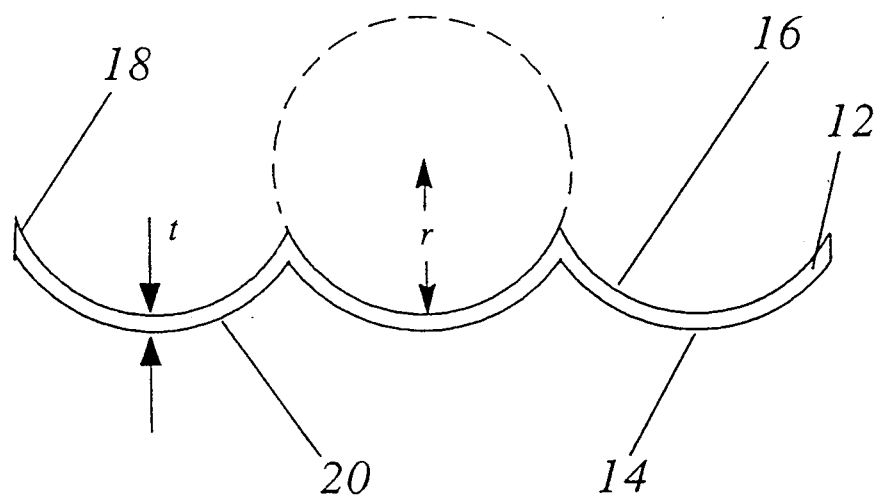
FIG. 2 is a partial schematic cross-sectional view of a fluorescent plastics sleeve for use in the luminaire source of FIG. 1.
Figure 3:
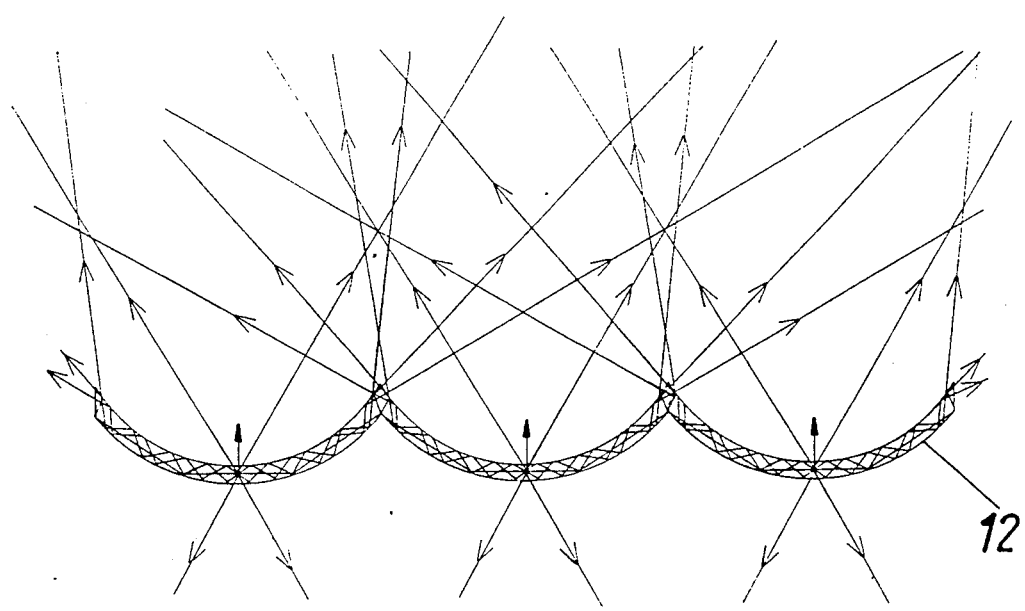
FIG. 3 illustrates an optical model of the sleeve of FIG. 2, showing detrapping of light entering the sleeve.

In the present invention the plastics sleeve 12 is suitably textured on its inner and outer surfaces 14, 16 so that all of the light trapped within the fluorescent plastic can 'escape' in the required direction, as can be seen from FIGS. 2 and 3.

The sleeve 12 comprises on its outer surface 16 a large number of concave depressions 18 which are in substantial alignment with convex protrusions 20 provided on the inner surface 14.

Optical modelling of this design, shown in FIG. 3, indicates that all light trapped within the fluorescent plastic emerges from the tips of the features incorporated in the sleeve and propagates in the required direction (i.e. away from the light source), only that light which is not trapped and is initially emitted in the direction of the glass tube (ca. 10% of the total light emitted) is not re-directed away from the source.

The design utilises the light guiding properties of fluorescent plastic to direct trapped light to abrupt changes in the orientation of the surface of the sleeve 12. Trapped light impinges upon such surfaces at angles incompatible with total internal reflection so that the light escapes from the sleeve. It can be arranged that these surfaces are all oriented in such a way that the light is emitted away from the light source. Provided that the radius of curvature (r) of each feature is relatively large compared with the thickness (t) of the sleeve (e.g. r=10t) then trapped light should not 'leak' out of the sleeve until the abrupt change in surface orientation is encountered. Thus the 80% of the light generated within the fluorescent plastic sleeve which is trapped therewithin will be directed in the required direction. In addition, half of the light not trapped (i.e. 10% of the light generated) will also escape in the required direction making a total of 90%. The remaining 10% will be directed back towards the lamp where it will be reflected by the glass and phosphor comprising the wall of the lamp. A proportion of this (approx half i.e. 5% of the light generated) will re-enter the sleeve where it too could be emitted in the required direction making the amount of light emerging from the sleeve in the required direction ca. 95% of the total light generated within the sleeve.

Depending upon the exact nature of the texturing required the tube could be fabricated in a variety of ways including extrusion, pressing or vacuum forming of sheet material followed by rolling into a tube or by injection moulding.

The lamp 2 may be manufactured by producing a standard size (e.g. 1800 mm long×26 mm diameter) glass-based high colour rendering fluorescent lamp in the conventional way except that the mixture of blue-green- and red emitting phosphors normally coated onto the inside of the tube is replaced by a single (cheap) blue-emitting phosphor (e.g. $Sr_2P_2O_7$:Sn). A suitably designed fluorescent plastic sleeve containing green-, yellow- and dark red-emitting fluorescent dyes is placed over the glass tube, the sleeve having a surface texture as shown in FIG. 2.

When the lamp is connected to a suitable electrical supply, UV light is generated which will stimulate the emission of blue light from the phosphor lining 6 of the tube 4. Some of the blue light escaping from the tube 4 will pass unchanged through the fluorescent plastic sleeve 12, the remainder will be absorbed and re-emitted at the characteristic wavelengths of the various green-, yellow- and dark red-emitting fluorescent dyes contained within the sleeve. Blue, green, yellow, and dark red light will thus emerge from the sleeve which will combine to give white light. Clearly other emission colours could be achieved by simply altering the composition of the fluorescent plastic sleeve.

Therefore, the present invention exploits existing fluorescent lamp technology and the cost advantages of fluorescent plastic by sleeving a glass-based fluorescent luminaire source containing a cheap blue emitting phosphor, with fluorescent plastic. The fluorescent plastic sleeve will be suitably textured so that all light trapped within the fluorescent plastic escapes in the required direction.

The above concept overcomes the problems outlined earlier in the following ways.

1. Blue light will efficiently excite fluorescent plastic without causing damage to it. Thus the use of a phosphor which absorbs UV light from the mercury discharge and re-emits it as blue light will provide an effective source of excitation for the fluorescent plastic. In addition, the absorption of UV light by the phosphor will prevent it from damaging the fluorescent plastic, and should any UV light not be absorbed by the phosphor it will be prevented from reaching the fluorescent plastic by the glass forming the walls of the lamp envelope.

2. By placing the fluorescent sleeve outside the evacuated region of the lamp envelope no chemical species released by the fluorescent plastic will contaminate the interior of the lamp.

3. Light extraction is achieved by appropriate texturing of the sleeve rather than the incorporation of scattering centres. As a result all trapped light is extracted and emitted in the required direction, instead of just 50% which would be obtained using scattering centers.

The present invention also enables a range of luminaires exhibiting different colour temperatures and hues but based on the same basic (i.e. blue-emitting) source may be produced by simply altering the composition of the fluorescent plastic sleeve. This would provide the opportunity of simplifying stock control and of benefiting from economies of scale due to the need to manufacture and store only one type of glass-based tube.

In addition, the use of fluorescent plastic sleeves offers an alternative fabrication route for those luminaires whose production has been affected by legislation preventing the use of particular lamp components. For example, red-emitting luminaires commonly incorporate a cadmium-containing filter on the outside of the glass envelope to absorb the unwanted blue and green emissions from the mercury vapour discharge. The use of cadmium has now been restricted so that an alternative fabrication route must be followed, such as the use of a red-emitting fluorescent plastics sleeve.

Although the present invention has been described with respect to a particular embodiment, it should be realised that modifications may be effected whilst remaining within the scope of the invention. For example, the sleeve may comprise a laminate structure and need not necessarily surround the housing 4. The sleeve could, therefore, comprise a number of segments, each containing a respective dye to enable several colours to be generated simultaneously by the radiation emitted from the phosphor coating. Furthermore, the phosphor coating may be arranged to generate other colours such as visible violet radiation in the desired wavelength range.

We claim:

1. A luminaire comprising a glass housing tube containing excitation means for exciting a phosphor material thereby to provide radiation having a wavelength greater than 420 nanometers, and a sleeve member, arranged to at least partially surround the glass housing tube and which sleeve member comprises a plastics material containing at least one fluorescent dye for providing visible light when excited by the radiation provided by the phosphor material, said sleeve member arranged to be supported by said tube.

2. A luminaire according to claim 1 wherein the radiation provided by the phosphor material comprises blue light, and the plastics material contains three fluorescent dyes for providing, respectively, red, yellow and green light.

3. A luminaire according to claim 2 wherein the excitation means comprises a gas discharge.

4. A luminaire according to claim 2 wherein the sleeve member comprises an outer surface having a plurality of concave depressions and an inner surface having a plurality of convex protrusions in substantial alignment with the concave depression on the outer surface.

5. A luminaire according to claim 4 wherein the sleeve member has a substantially uniform thickness and the concave depressions have a radius of curvature at least ten times the thickness of the sleeve member.

6. A luminaire according to claim 1 wherein the excitation means comprises a gas discharge.

7. A luminaire according to claim 6 wherein the sleeve member comprises an outer surface having a plurality of concave depressions and an inner surface having a plurality of convex protrusions in substantial alignment with the concave depressions on the outer surface.

8. A luminaire according to claim 7 wherein the sleeve member has a substantially uniform thickness and the concave depressions have a radius of curvature at least ten times the thickness of the sleeve member.

9. A luminaire according to claim 1 wherein the excitation means comprises a gas discharge.

10. A luminaire according to claim 1 wherein the sleeve member comprises an outer surface having a plurality of concave depressions and an inner surface having a plurality of convex protrusions in substantial alignment with the concave depressions on the outer surface.

11. A luminaire according to claim 10 wherein the sleeve member has a substantially uniform thickness and the concave depressions have a radius of curvature at least ten times the thickness of the sleeve member.

* * * * *